(No Model.)
C. HALSTEAD.
COFFEE URN.
No. 273,067. Patented Feb. 27, 1883.
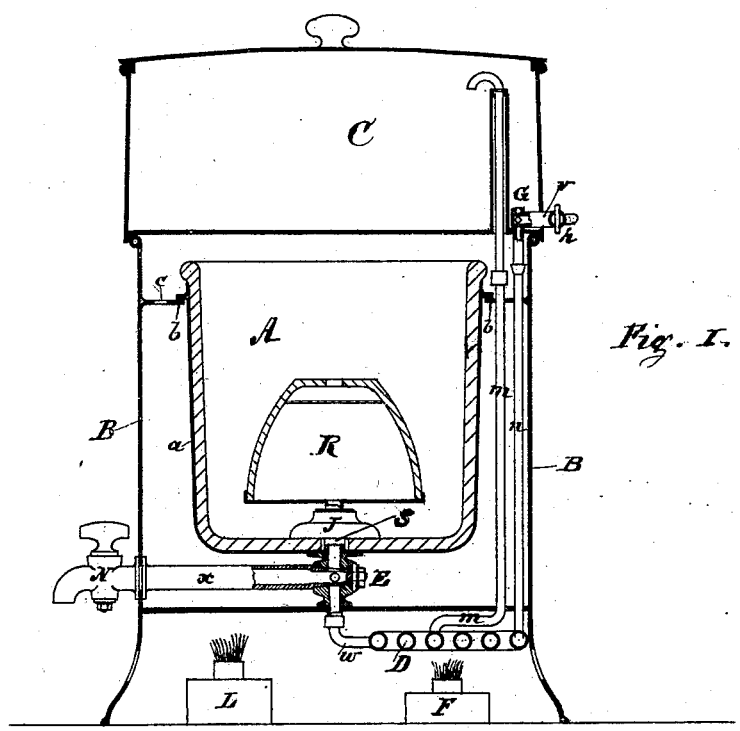
Fig. I.
Fig. II.
Witnesses.
John F. Allen
Richard F. Nagle
Inventor.
Charles Halstead
per Treary & Roeder
Attorney

UNITED STATES PATENT OFFICE.

CHARLES HALSTEAD, OF NEW YORK, N. Y.

COFFEE-URN.

SPECIFICATION forming part of Letters Patent No. 273,067, dated February 27, 1883.

Application filed August 24, 1882. (No model.)

*To all whom it may concern:*

Be it known that I, CHARLES HALSTEAD, a citizen of the United States, and a resident of the city of New York, in the State of New York, have invented a new and Improved Coffee-Urn, of which the following is a specification.

In the accompanying drawings Fig. I represents a view, partially in section, of a coffee-urn embodying my invention. Fig. II represents a vertical section of the cock and internal nut.

A is a vessel in which the coffee is made, provided with a receptacle, R, to receive the ground coffee, and is similar in construction as fully described in my Patent No. 219,857, dated September 23, 1879. This vessel is made of semi-vitreous or unvitreous earthenware, (but I prefer to make the same semi-vitreous,) and is inclosed in a tight-fitting metal covering, a, to prevent the earthenware vessel from damage. This vessel A is surrounded by a metal chamber, B, and supported in the same on suitable projections, b. This chamber B is supplied with hot water through the opening C in the supporting-ledge b, or through any other suitable opening, for the purpose of keeping the made coffee in the vessel A always warm.

Above the chamber B a chamber, C, is supported for receiving the boiling water from which the coffee is to be made.

From the chamber C a pipe, n, is arranged, running downward inside the chamber B and extending below the bottom of said chamber B, where a coil, D, is formed, covering about one-half of the bottom surface, and terminating in a pipe, m, extending upward again and discharging into the chamber C.

From the coil D a branch, w, connects the same with the cock E and with the bottom of the vessel A.

Below the coil D a lamp, F, is arranged for the purpose of heating and boiling the water passing through the coil D.

The upper end of the pipe n is closed with a three-way cock or valve, G, so arranged as to allow the water from the chamber C to pass either into the pipe n downward or into the branch pipe v, and be drawn off through the faucet h. By this arrangement the water in the chamber C can always be kept boiling by passing down the pipe n, through the coil D, and back again into the chamber C through the pipe m; or when the cock E is opened and a connection is formed with the vessel A boiling water will enter into said vessel A for the purpose of making coffee, which is the great secret of making good coffee.

The vessel A is connected to the cock E by means of the internal nut, J. This cock E is a three-way cock, forming a connection either between the inside of the vessel A and the pipe w, connected with the coil D, to allow the boiling water to pass into the receptacle R, containing the coffee, for the purpose of concocting the coffee, or to form a connection with the pipe x, which said pipe is a continuation of the plug of the cock E, passes through the chamber B, and is provided with a faucet, N, at its end for the purpose of drawing off the coffee when required. The pipe x forms thus at the same time the rod or handle for operating the cock E as required.

That part of the bottom of the chamber B not covered by the coil D may be heated by the flame of a suitable lamp, L, for the purpose of heating the water in said chamber and surrounding the vessel A.

To present the least possible quantity of metal in the inside of the vessel A, in which the coffee is made and preserved, I construct the nut J, through which the cock E is attached to the bottom of the vessel A, as represented in Fig. II. The same consists of a cup-shaped flange, 2, made of earthenware or of the same material as the interior of the vessel A, into which the nipple or sleeve 3, containing the thread and forming the nut for the screw end of the cock E, is fastened by means of flat nut 4, situated in the cavity of the lower part of the flange 2, a small lip, 5, made on the upper end of the sleeve 3, only bearing upon the top of earthenware flange 2. By this arrangement only a very little metal surface will be exposed in the inside of the vessel A, and the hole s in the bottom of said vessel may be made very large, to allow for any difference in expansion between the metal end of the cock E and the earthenware part of the vessel A. When two or more urns are to be operated at the same time the chamber C may be supported as an independent stand, in which case the coil D is placed directly under the bottom of said chamber C, and the branch pipe w connected to the cock E in the manner as above described, the flame or lamp F being arranged directly under the coil D.

What I claim as my invention, and desire to secure by Letters Patent, is—

1. In combination with a coffee-urn consisting of the semi-vitreous vessel A, chamber B, and chamber C, the pipe n, with cock or valve G, coil D, pipe m, lamp F or its equivalent, pipe w, and cock E, in the manner and for the purpose substantially as described.

2. The combination of the vessel C, pipe n, having cock or valve G, coil D, pipe m, and cock E, with the vessel A, as and for the purpose specified.

3. In combination with the vessel A and cock E, the fastening-nut J, consisting of the earthenware flange 2, the sleeve 3, having lip 5, and the nut 4, as and for the purpose set forth.

CHARLES HALSTEAD.

Witnesses:
HENRY E. ROEDER,
J. B. NONES.